May 12, 1931. P. G. RUDIN 1,804,707

MIXING MACHINE

Filed Nov. 18, 1929 2 Sheets-Sheet 1

Inventor,
Philip Gordon Rudin
By his Attorney

May 12, 1931.  P. G. RUDIN  1,804,707
MIXING MACHINE
Filed Nov. 18, 1929   2 Sheets-Sheet 2
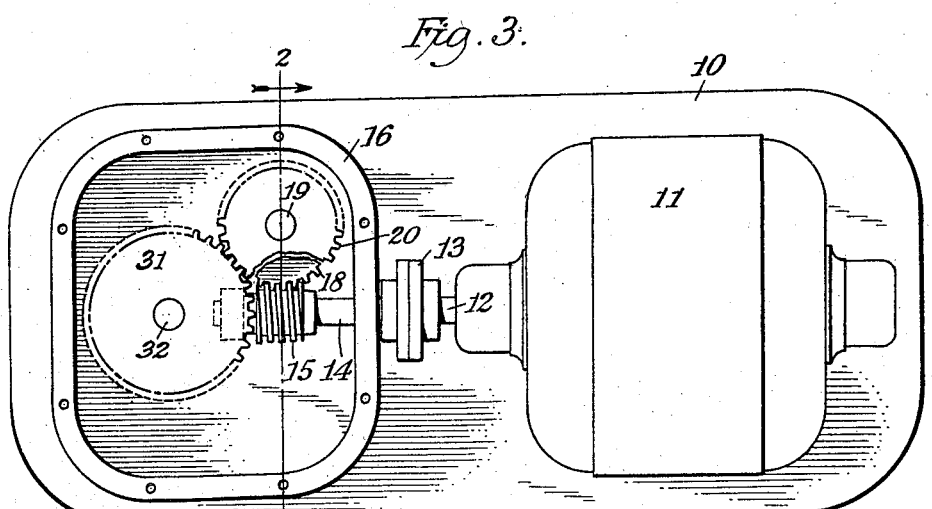
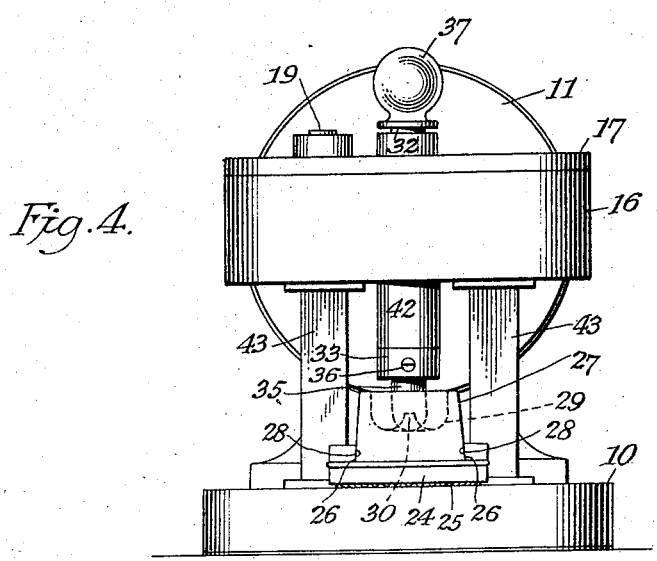
Inventor,
Philip Gordon Rudin,
By his Attorney Patented May 12, 1931

1,804,707

UNITED STATES PATENT OFFICE

PHILIP GORDON RUDIN, OF PITTSBURGH, PENNSYLVANIA

MIXING MACHINE

Application filed November 18, 1929. Serial No. 407,892.

This invention relates to improved apparatus for automatically and mechanically mixing ingredients in producing powders, salves, cements, colors, amalgams and the like.

The object of the invention being to provide an apparatus for accomplishing the above described operation in a thorough, quick and economical manner, and for producing movements, in a machine approximately simulating the usual manually imparted movements to a pestle in co-operation with a mortar commonly used by chemists, druggists, dentists, doctors, and by others.

The apparatus of the invention may include a revolubly mounted mortar and a revoluble pestle mounted in eccentric relation to the mortar, the rotation of the mortar and pestle being in the same direction but of different speeds, thus imparting a desirable moderate milling or grinding action to the mortar contents and effectually separating or dividing the mass into minutest particles giving a fined resultant mixture without burning or otherwise harming the material operated on.

Important features and advantages of the invention may be set forth as follows:

1. Time and labor saver.
2. Constant uniform pressure exerted by the pestle on the mortar contents, not obtainable in manual operation.
3. Variable speeds of coacting grinding surfaces, achieves better mixing, grinding or amalgamation of the mortar contents, as two separate and desirable functions are obtained, viz: a milling or grinding action and a rubbing or trituratory action for separating the smallest particles.
4. The cross sectional contour or shape of the mortar, permitting the contents to rise up, drop over the highest point of the inside and back into the lowest point of the circular channel of the mortar so that said contents of materials may again come under the action of the pestle and this action occurs over and over again.
5. My improved mortar may be easily and quickly cleaned while in the operative position since it obtains its aims without extra grooves and the like with their constant clogging, or it may be readily removed from its driving element, if necessary, or desirable.
6. My mortar and pestle may turn in the same direction with a desirable moderate difference of speeds so as to avoid the burning, annealing, or other deterioration of some materials, accompanying a rubbing, amalgamating, etc., at higher speeds.
7. All the driving elements in this machine are placed back of the mixing mechanism leaving the latter one free to be operated on.

The mortar and its co-acting pestle may be constructed of a suitable or appropriate material, such as glass, porcelain, chromium steel, or other hard substance that will withstand the necessary operative thrusts.

In the drawings illustrating a preferred embodiment of my invention,

Fig. 3 is a plan view of the mixing machine with the top plate or cover removed from the head or casing.

Fig. 4 is a front or end elevation of the apparatus.

Figure 1:
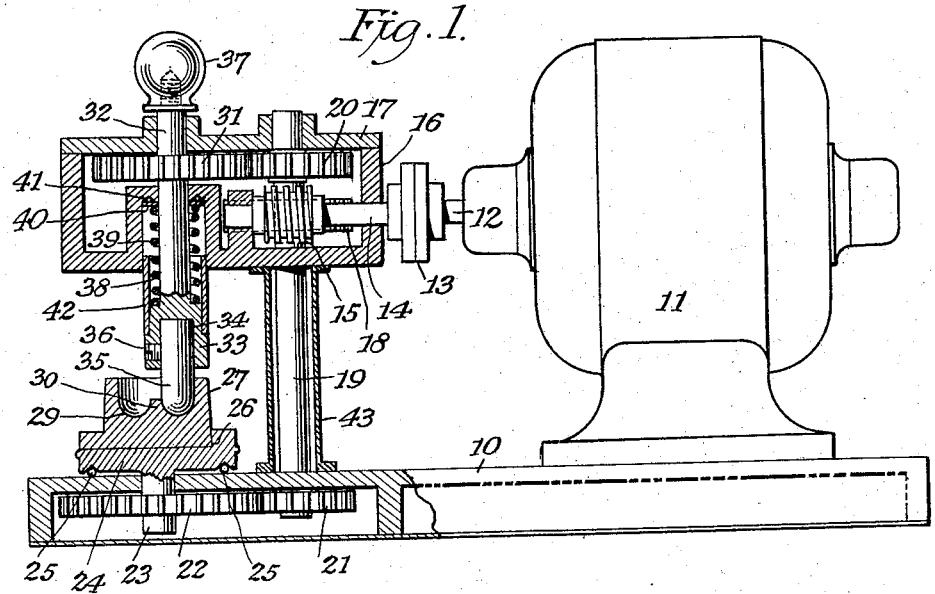
Fig. 1 is a central longitudinal sectional elevation of my improved mixing machine or apparatus.
Figure 2:
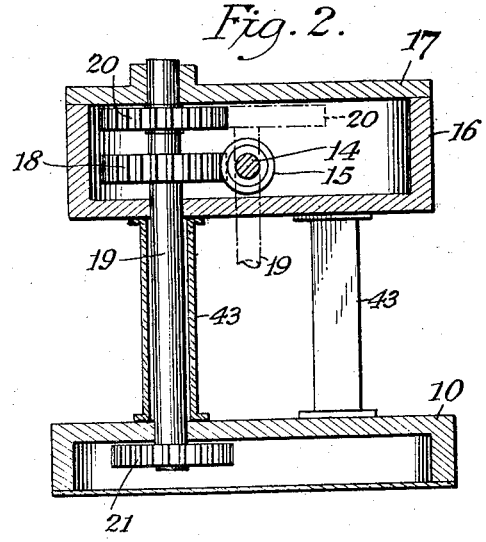
Fig. 2 is a vertical cross sectional elevation taken about on the line 2—2 of Fig. 3.

Referring to the drawings in detail, 10 designates a base frame or casting supporting at one end an electric motor 11, having its shaft 12 coupled, as at 13, to an extension shaft 14, carrying a worm 15. This last named shaft may be suitably journalled in bearings provided in a casing or head 16 having a removable cover or top plate 17.

The worm 15 is in constant mesh with a suitable gear 18, fast to a revoluble counter shaft 19 arranged vertically in appropriate bearings in the casing 16, and also carried on this counter shaft, near its top, is another gear 20, and at the lower end of the same shaft and under the base plate 10 is another gear 21 which meshes with a larger gear 22, fast on a stub shaft 23, carrying a turntable 24, supported on the base plate 10 by ball bearings 25.

The turntable 24 is formed with a groove 26, having dovetailed sides to receive and hold a mortar 27 having correspondingly dovetailed sides. The mortar is normally prevented from moving out of the confining groove 26 by a pair of side friction springs 28, and said mortar is formed with a circular channel 29 surrounding a central teat or table 30, as clearly shown in Fig. 1 of the drawings. This central teat 30 may, if desired extend upwardly to the height of the outer wall of the mortar 27.

Meshing with the gear 20 on shaft 19 is a larger gear 31 fixed on a revoluble pestle shaft 32, having a unitary head 33 provided with a socket 34 in which the pestle 35 is held by set screw 36. The pestle is here shown as formed of a single piece having its lower end shaped to conform to the curvature of the channel 29 and more or less snugly fitting said channel and making contact with its side walls. The pestle may however carry a round member such as a ball which may rotate independently of the pestle. The pestle shaft 32 has a reduced threaded extension at its top to receive a hand knob 37 by which said shaft may be raised against the action of a spiral spring 38 arranged in a spring chamber 39 in the casing 16 with its lower end resting on the shaft head 33, while the upper end of the spring bears against a washer 40 resting on ball bearings 41. The lower portion of the spring chamber is closed by a sleeve 42 as shown in Fig. 1.

Two supporting standards 43 resting on base plate 10 back of the turntable 24 are carrying the gear box 16 and its associated mechanisms.

The motar 27 may be removed as follows: Knob 37 is lifted against the compression resistance of the spring 38, and when the pestle 35 is raised high enough to permit the egress of the mortar, the same may be removed or replaced as will be obvious.

The operation of the machine will be obvious to those versed in this art from the drawings and the herein description. The mechanism described, obtaining its power from an easily exchangeable standard electric motor 11, will cause both the turntable 24 with its motar 27, and the pestle 35 to rotate, the pestle also traveling along the groove 29 in the motar, due to the excentric placing of the said two elements, and contacting throughout with the perpendicular walls of the groove 29, providing a maximum working space.

The motar and pestle rotate at different speeds and the material is moved around thereby and is pressed between the pestle and the walls of the groove thereby breaking the material into the smallest particles by means of pressure and rubbing and thus thoroughly mixing the material both mechanically and chemically.

It is understood that changes and variations may be made in the parts and combinations of my device and I hereby reserve my rights to such changes as are within the spirit of the invention and the scope of the annexed claims.

What I claim as new, is:

1. In a mixing machine, a mortar having an annular channel of symmetrical cross section in relation to the center line of said channel; a pestle shaped to operate in said channel, so that its end is adapted to completely fill out the cross section of said channel while being rotated therein; means to rotate said mortar; means to rotate said pestle, said mortar and said pestle being excentrically arranged so that said pestle may travel along said channel while said mortar is being rotated.

2. In a mixing machine, a mortar having an annular channel of symmetrical cross-section in relation to the center line of said channel; a pestle shaped to operate in said channel, so that its end is adapted to completely fill out the cross-section of said channel while being rotated therein; means to rotate said mortar; means to rotate said pestle, said mortar and said pestle being eccentrically arranged so that said pestle may travel along said channel while said mortar is being rotated, said mortar having a central teat so that the material in said channel may be pushed up onto the said teat and then off of it into another portion of said channel.

3. In a mixing machine, a mortar having an annular channel of symmetrical cross-section in relation to the center line of said channel; a pestle shaped to operate in said channel, so that its end is adapted to completely fill out the cross-section of said channel while being rotated therein; means to rotate said mortar; means to rotate said pestle, said mortar and said pestle being eccentrically arranged so that said pestle may travel along said channel while said mortar is being rotated, the outer wall of said channel being higher than the inner one and being in close contact with the contour of said pestle.

4. In a mixing machine, the combination with a mortar having an annular channel and a pestle shaped to closely fit both sides of said channel and being eccentrically mounted relative to said mortar, means for rotating said pestle and mortar in a co-operative relation in the same direction, means for resiliently forcing said pestle into engagement with said channel with a predetermined pressure and resulting in a regulated non-stirring grinding action simultaneously at both sides of the pestle, the inner circle of said annular channel forming a central teat for the mixture at the pestle end to rise over and fall back into the opposite portion of the channel thus causing the mixture in said channel to repeatedly come under the grinding action of the said pestle.

Signed at Pittsburgh in the county of Allegheny and State of Pennsylvania, this 9th day of November, 1929.

PHILIP GORDON RUDIN.